UNITED STATES PATENT OFFICE.

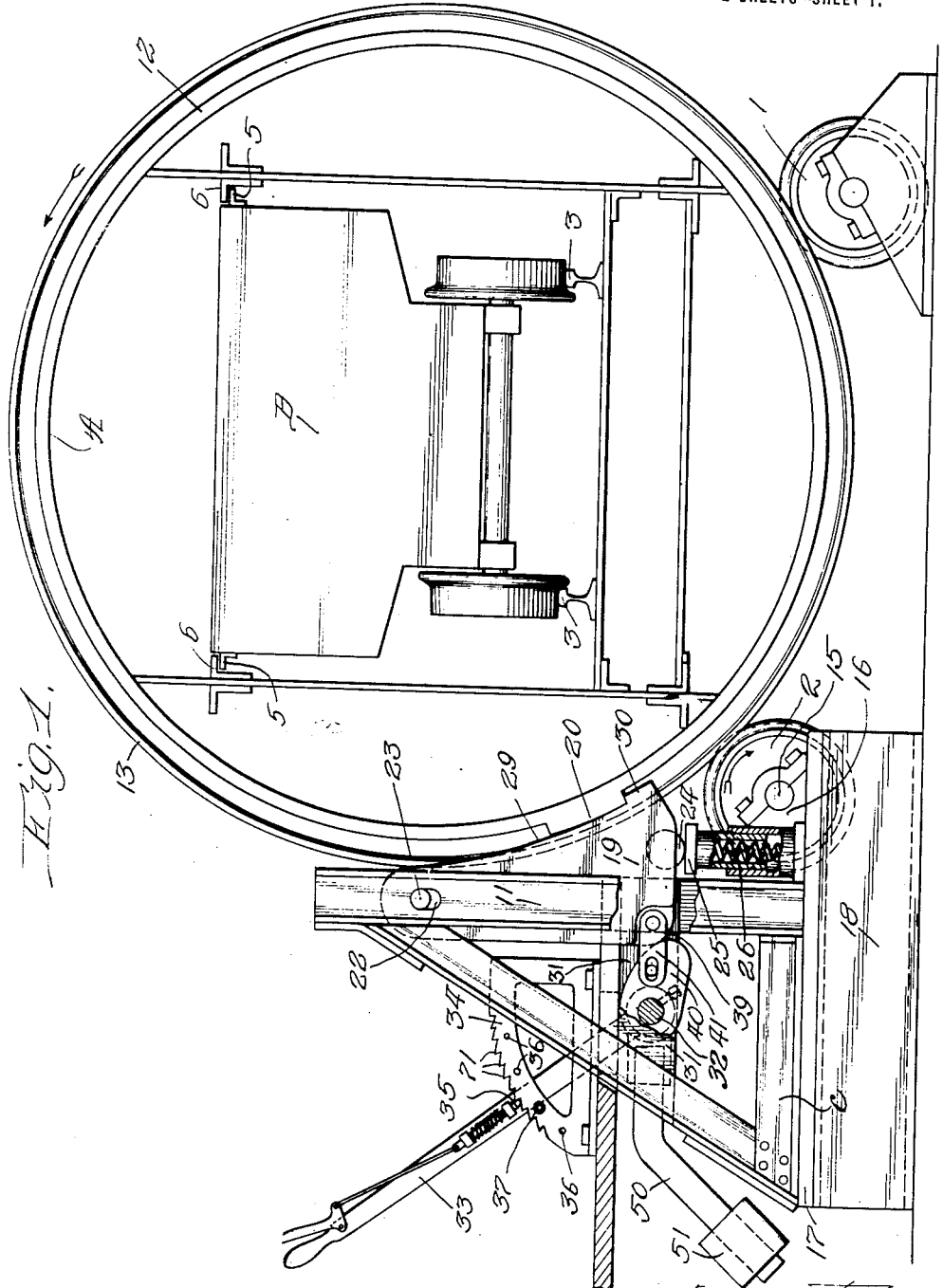

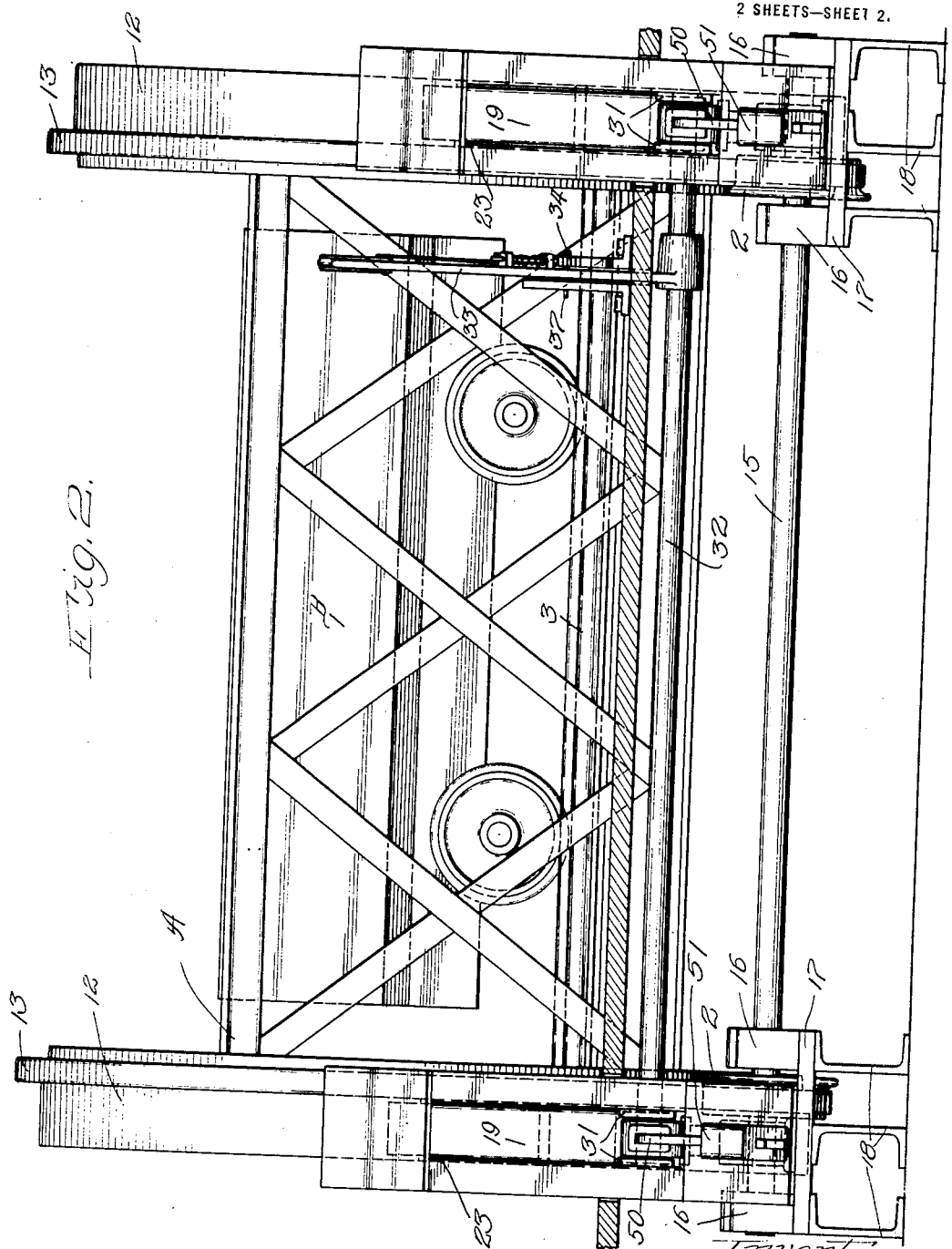

GEORGE N. SIMPSON, ARTHUR M. SIMPSON, AND WALTER H. SIMPSON, OF CHICAGO, ILLINOIS.

ROTARY CAR-DUMPER.

1,397,936.  Specification of Letters Patent.  Patented Nov. 22, 1921.

Application filed April 21, 1920. Serial No. 375,570.

*To all whom it may concern:*

Be it known that we, GEORGE N. SIMPSON, ARTHUR M. SIMPSON, and WALTER H. SIMPSON, citizens of the United States, residing at Chicago, in the county of Cook and State of Illinois, have invented new and useful Improvements in Rotary Car-Dumpers, of which the following is a specification.

This invention relates to improvements in rotary car dumpers, and is more especially adapted for use in connection with that type of rotary car dumper which comprises a substantially cylindrical rolling cage supported on rollers with means for continuously driving one pair of the supporting rollers to impart rotation to the cage, and means for lifting the cage from contact with such continuously rotating rollers when it is desired to stop rotation of the cage, and letting the cage down into contact with such rollers when it is desired again to commence rotation.

In the operation of dumps of the class as described above it has been found difficult to perfect the means for moving the rotating cage away from and into contact with the continuously rotating rollers in order to stop and start the rotation. Such a cage with an empty car upon completion of its rotation has considerable momentum and must be brought to rest at a predetermined point. One of the main difficulties has been to construct means to bring the cage to rest at the exact point desired without a jar and without damage to the parts. The devices heretofore made have not been capable of the adjustments required in order to cause the dump to rotate and stop satisfactorily under varying conditions. In this connection it must be borne in mind that dumps of this class frequently operate with varying loads and under changing conditions. The means used for starting and stopping the rotation of the cage should be capable of adjustment to meet variations in loads, and changes in conditions affecting the operation of the device. Changes in temperature will affect the condition of oil used in the mechanism with a consequent effect on the ease of rotation. At times, rotation of the cage will be hindered by dirt and dust and at other times it will be relatively free from foreign substances and rotate more easily. In order to meet these varying conditions which affect the operation of the device, means for raising and lowering the cage from the continuously rotating rollers in order to stop the same at a predetermined point should be capable of easy and efficient adjustment; and also of sufficient strength to withstand the heavy usage to which exposed.

We have designed means for use in connection with a dump of the class described for raising and lowering a rotating cage from the continuously rotating rollers in order to stop rotation at a predetermined point, and again cause the cage to rotate. Our improved device overcomes the objections noted above to those of this same general class heretofore in use. Our improved device is so designed that it will withstand the heavy usage to which mechanism of this class is exposed; but it is also so designed that it is readily capable of fine and accurate adjustment in order to meet all variations affecting the operation, such as variations in load, temperature, dirt, etc.

Our improved device is also so designed that it always will stop the rotation of the cage at the exact point desired without a jar or jolt.

A device embodying the features of our invention is shown in the accompanying drawings in which:

Figure 1, is a view in end elevation of a rotating car dumper showing our improved device.

Fig. 2, is a view of the same thing in side elevation.

As shown in said drawings A indicates a substantially cylindrical cage supported on the two pairs of rollers 1, 1 and 2, 2. Within the cage A are supported two sections of rails 3, 3 adapted to have run onto them a car B the contents of which it is desired to dump. On the sides of the body of the car B are mounted two angle irons 5, 5 which lie just below the two angle irons 6, 6 mounted within the cage, when the car B is in place and ready to be dumped. The angle irons 6, 6 acting on the angle irons 5, 5 on the car hold the car on the rails as the cage rotates. The pair of rollers 1, 1 are free to rotate on their axles. The pair of rollers 2, 2, are connected in any suitable manner to a power device which imparts rotation to them in the direction indicated by the arrow in Fig. 1. The particular construction of the cylindrical cage A, the means for supporting the car B within the cage, and the means for arranging the rollers 1, 1 and 2, 2 which support the cage are old in the art and form no part of the present invention. Likewise the means for imparting rotation to the pair of rollers 2, 2 forms no part of the present invention.

In general the operation of a device of the class described is as follows. When the cage A is at rest it is supported on the pair of rollers 1, 1 and a shoe or stop or other means which lifts it slightly from contact with the continuously rotating rollers 2, 2. When in this position, a car B, the contents of which it is desired to dump, is run into the cage on the rails 3, 3. When the car is in position in the cage ready to be dumped, the cage is allowed to come into contact with the rollers 2, 2. It is obvious that when contact between the rollers 2, 2 and the cage takes place, that the cage will commence to rotate in the direction indicated by the arrow in Fig. 1. Rotation of the cage will overturn the car B causing its contents to be dumped. Rotation of the cage is allowed to continue until it has almost completed one rotation, when it is again lifted from the rollers 2, 2 and its momentum checked until it is brought to rest with the car B in a vertical position.

We will now describe specifically the particular means for lifting the cage A from contact with the rollers 2, 2 and stopping rotation of the same. It is in this mechanism that the features of our invention lie. As will be noted from Fig. 2, the two continuously rotating rollers 2, 2 are connected by the shaft 15 the ends of which are journaled in the bearings 16, 16. The bearings 16, 16 are supported by the platforms 17, 17 which in turn are supported by the transverse channel beams 18, 18. The two end rings of the cage A are indicated by 12, 12. These rings are provided near their inner edges with radial flanges 13, 13 which rest on the rollers 2, 2 and 1, 1 when the cage is rotating. On each of the platforms 17, 17 is provided a frame C in which is supported a shoe 19 adapted to be moved to a position where it will come into contact with a block 20 on the ring 12 so that such engagement between the shoe and the block will retard the rotation of the cage and lift the same from the wheel 2. The block 20 is fastened to the outside of the flange 13 so that it will not come into contact with the rollers 1 or 2 during rotation of the cage. Since there are two shoes 19 and two blocks 20, which operate in a similar manner, we will describe the construction and operation of but one. The frame C comprises two parallel triangular shaped frames of angle irons securely bolted or riveted together. These two triangular frames are mounted on the platform 17 with their long vertical sides close to, and tangential to the ring 12. We have indicated these long vertical sides of the frame C by the reference numeral 11. Near the upper end of each of the sides 11, 11 of the frame C there is provided a vertical slot 22. These slots 22, 22 lie substantially in a horizontal plane which passes through the center of rotation of the cage A. Mounted between the two members 11, 11 of the frame C is the triangular shaped shoe 19 which has a short shaft 23 extending through its upper end with the ends of such shaft lying in the slots 22, 22. The shoe 19 is free to pivot on the shaft 23. The lower end of the shoe 19 is provided with a roller 24 the lower surface of which extends below the lower edge of the shoe 19 and rests upon a cushion buffer 25 which is supported by the spiral spring 26. Normally the spring 26 and the buffer 25 acting against the roller 24 at the bottom of the shoe 19 hold such shoe in its uppermost position, that is, with the shaft 23 against the upper ends of the slots 22, 22 as shown in Fig. 1.

The front face 29 of the shoe 19 is curved to conform substantially to the curvature of the ring 12 and provided at its lower end with the stop 30.

When the cage A is rotating the shoe 19 will be in a position with its curved face 29 a short distance from the outside edge of the ring 12 so that the flange 13 will rest on the roller 2. The ring 12 is provided with the block 20. The shoe 19 lies slightly to the outside of the flange 13 and is so placed that when it is pushed toward the ring it will come into contact with the block 20. When it is desired to stop the rotation of the cage A the shoe 19 is moved to a position so that as the block 20 comes around it will engage with the curved surface 29 of the shoe 19 and lift the cage A from the roller 2. The momentum of the cage will cause the block 20 to slide along the curved surface 29 of the shoe 19 and the resulting friction will gradually check the rotation of the cage until the block 20 comes into engagement with the stop 30 when the rotation of the cage will be entirely stopped. Such engagement of the block 20 with the stop 30 will not cause a jar or jolt or abrupt stop, however, since upon such engagement taking place the shoe 19 will depress the buffer cushion 25 causing compression of the spring 26 until the rotation of the cage is stopped. The tension of the spring 26 is sufficient, however, to again raise the shoe 19 to its uppermost position causing the cage A to rotate backward a very slight distance until it is in its position of rest with the car B vertical and the flange 13 not in contact with the roller 2, as shown in Fig. 1. It is obvious that, without detracting from the spirit of our invention, other shock absorbing means can be substituted for the buffer cushion 25.

The following means are provided for moving the shoe 19 as described above. Mounted in each frame C is a bearing block 31 which supports a longitudinal shaft 32. On one end of the shaft 32 is provided the operating lever 33 which is provided with the segmental ratchet 34 and detent 35 of usual construction. The segmental ratchet 34 is also provided with a series of holes 36, 36 in which is adapted to be inserted a pin 37 to limit the movement of the lever 33. The lower outside corner of the shoe 19 is curved as indicated by 39. Mounted on the shaft 32 is the oval shaped cam 40 adapted to engage with the rounded corner of the shoe 19 so that rotation of the shaft 32 will cause the shoe 19 to swing inwardly on the shaft 23 toward the ring 12 of the cage A. A short link 41 is also provided to connect the cam 40 with the shoe 19 so that upward movement of the lever 33 and consequent rotation of the shaft 32 and movement of the cam 40 away from the shoe 19 will operate through the link 41 to swing the shoe 19 away from the ring 12 on the cage A. The shaft 32 is provided with the arm 50 on the end of which is mounted the counterweight 51 for the purpose of assisting in holding the shoe 19 in position as the block 20 comes into contact with such shoe, and itself alone returning the shoe 19 to the stopping position whenever the lever 33 is released by the operator.

As mentioned before, the frame C and shoe 19 and other parts described have duplicates at the other end of the cage A, the shaft 32 extending the entire length of the cage A and operating both shoes 19, 19 together by means of the single lever 33.

The operation of the device is as follows: As shown in Fig. 1, the cage A is at rest and the flange 13 on the ring 12 is not in contact with the roller 2. The block 20 is in contact with the curved surface 29 of the shoe 19 and rests against the stop 30. When it is desired that rotation of the cage commence, the detent 35 is released from the teeth of the ratchet 34, the lever 33 is moved toward the cage A with the result that the link 41 will cause the shoe 19 to swing on the shaft 23 away from the ring 12 with the result that the block 20 will become disengaged from the stop 30 so that the flange 13 will drop down onto the rotating roller 2. The cage A will then rotate in the direction indicated by the arrow until the car B has been inverted and the contents dumped therefrom. After the block 20 has become disengaged from the stop 30 and rotation has commenced, and before the block 20 has made a complete revolution the lever 33 is moved away from the cage A with the result that the cam 40 will engage the rounded corner at the lower end of the shoe 19 moving such shoe toward the ring 12 until it is in the position shown in Fig. 1. When this position of the shoe 19 has been ascertained the pin 37 can be inserted in the proper hole in order to limit the movement of the lever 33 so that the proper position of the shoe can be easily fixed. When the cage A has made nearly one complete revolution, the block 20 will come into contact with the curved surface 29 causing the flange 13 to be lifted from the roller 2 and the momentum of the cage to be checked until the block 20 engages with the stop 30 whereupon rotation will be stopped as explained hereinbefore, the cushion buffer 25 preventing a jar or bolt.

It will be noted that adjustment of our mechanism may easily be made. Variations in the amount of dirt or grease on the curved surface 29 of the shoe 19, variations in temperature and variations in load in the car of the cage will necessitate different positions of the shoe 19 in order to bring the cage A to a stop at the proper point. By means of the teeth 71 on the segment 34 and the holes 36, 36 permitting various adjustments for the pin 37, the limit of movement of the lever 33 may be varied as desired so that the proper position of the shoe 19 for stopping the cage may be ascertained. It is obvious also that wear on the curved surface 29 will take place requiring different adjustments of the shoe 19. These different adjustments may be made as just described.

In the event that the friction between the block 20 and the curved surface 29 of the shoe 19 stops the cage before the block 20 reaches the stop 30 the shoe 19 can be moved away from the cage allowing the ring 12 to again rest on the roller 2 so that rotation will be resumed whereupon the shoe 19 can again be thrown into contact with the block 20 so that the block 20 will slide along the curved surface 29 until it stops against the stop 30.

We claim:

1. In combination with a rotating cage normally partially supported by a continuously rotating roller, means for lifting such cage from contact with such roller.

2. In combination with a rotating cage normally partially supported by a continuously rotating roller, means for lifting such cage from contact with such roller, such means consisting of a shoe adapted to be moved to a position where it will be engaged by a part on the cage.

3. In combination with a rotating cage normally partially supported by a continuously rotating roller, means for lifting such cage from contact with such roller, such means consisting of a shoe adapted to be moved to a position where it will be engaged by a part on the cage, such shoe being pivoted at its upper end and supported at its lower end on a shock absorbing buffer.

4. In combination with a rotating cage normally partially supported by a continuously rotating roller, means for lifting such cage from contact with such roller, such means consisting of a shoe adapted to be moved to a position where it will be engaged by a part on the cage, such shoe being pivoted at its upper end in a vertical slot and supported at its lower end on a shock absorbing buffer.

5. In combination with a rotating cage normally partially supported by a continuously rotating roller, means for lifting such cage from contact with such roller, such means consisting of a shoe having a curved surface adapted to engage with a part on the cage.

6. In combination with a rotating cage normally partially supported by a continuously rotating roller, means for lifting such cage from contact with such roller, such means consisting of a shoe having a curved surface with a stop at the lower end.

7. In combination with a rotating cage normally partially supported by a continuously rotating roller, means for lifting such cage from contact with such roller, such means consisting of an adjustable shoe having a curved surface with a stop at the lower end.

In witness whereof, we have hereunto subscribed our names this 17 day of April, 1920.

GEORGE N. SIMPSON.
ARTHUR M. SIMPSON.
WALTER H. SIMPSON.